April 23, 1957 L. HAWKINS 2,789,536
FOWL OR POULTRY FEEDING DEVICE
Filed July 18, 1955 2 Sheets-Sheet 2
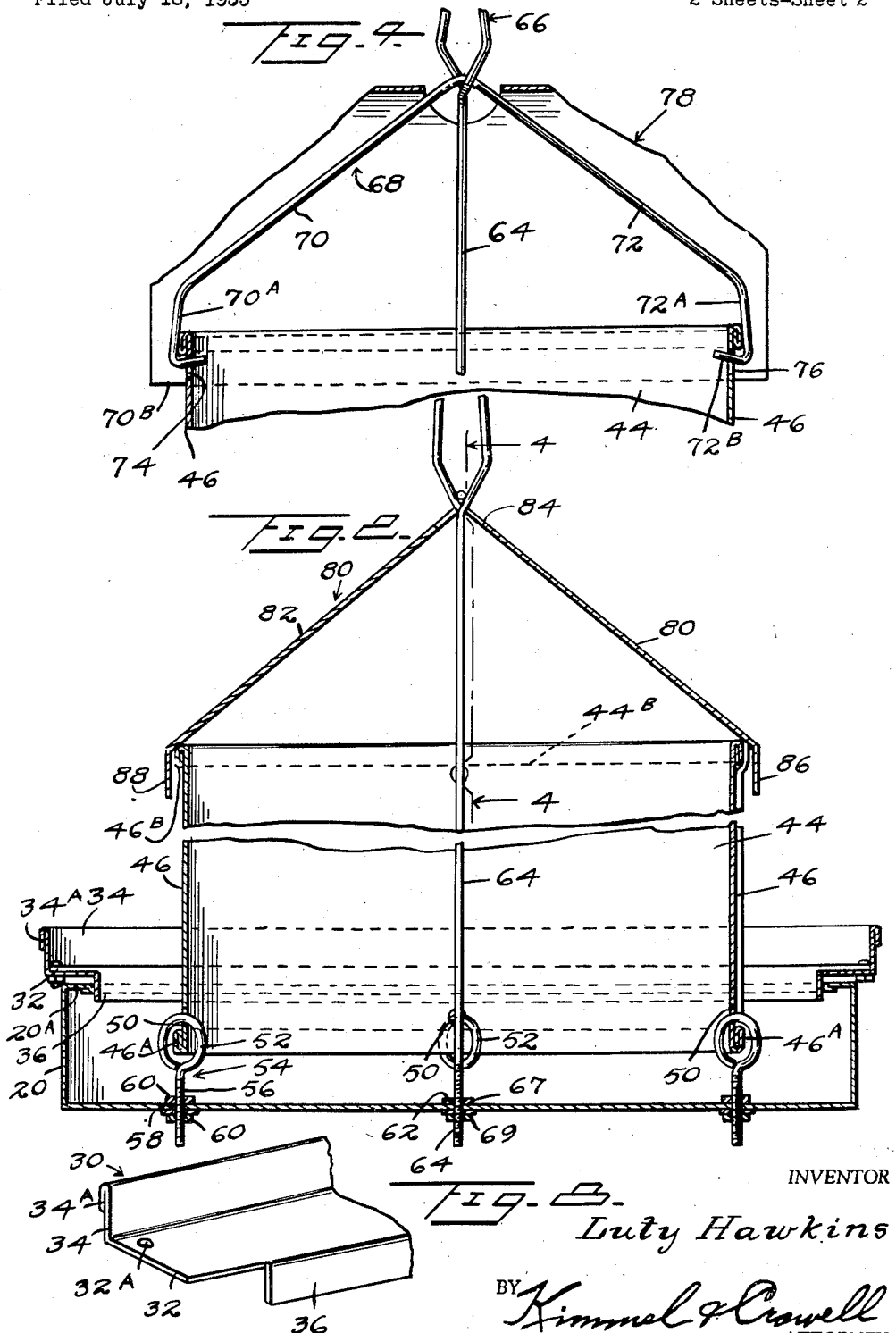
INVENTOR
Luty Hawkins
BY Kimmel & Crowell
ATTORNEYS

# United States Patent Office 2,789,536
Patented Apr. 23, 1957

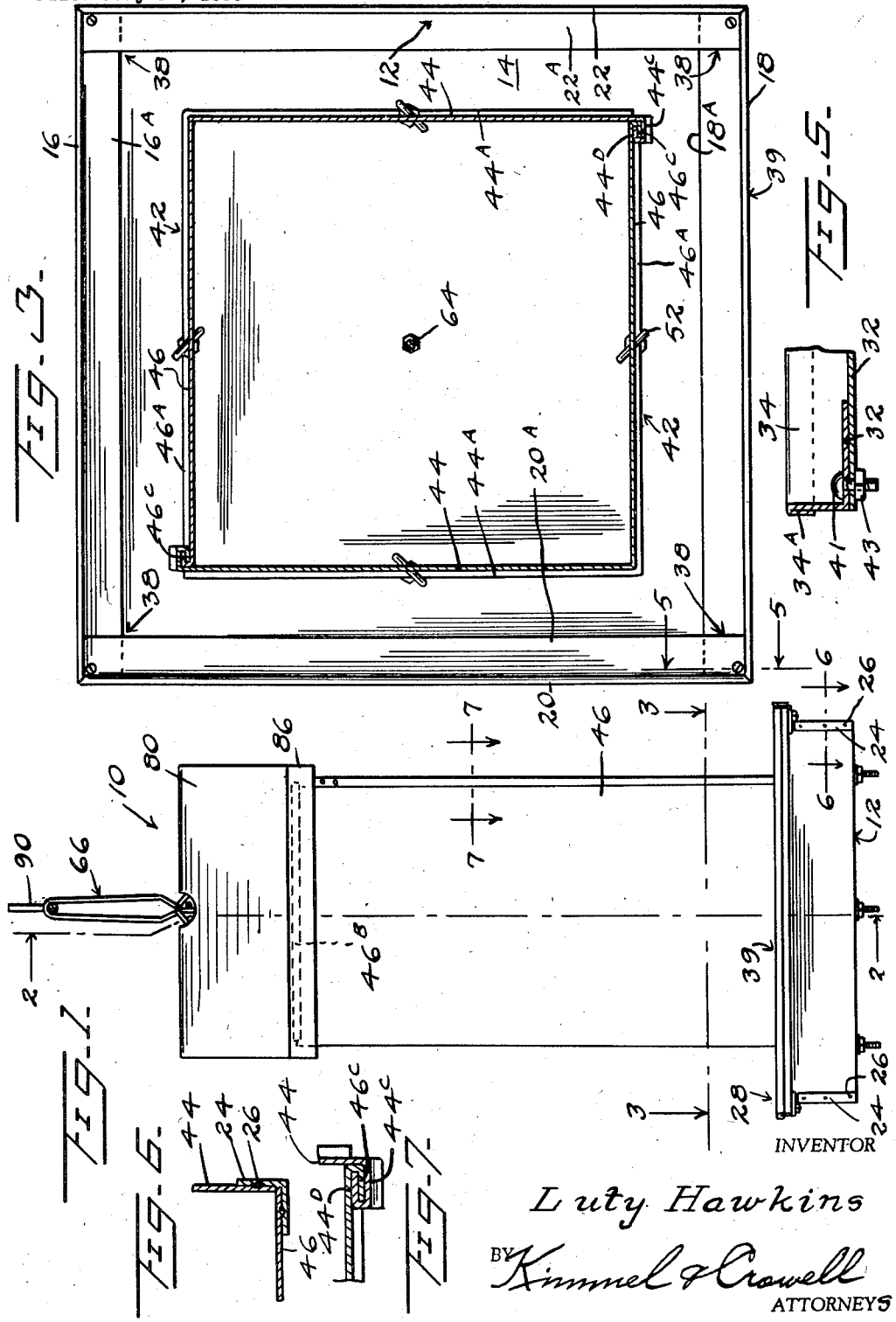

2,789,536

FOWL OR POULTRY FEEDING DEVICE

Luty Hawkins, Mount Vernon, Ill.

Application July 18, 1955, Serial No. 522,787

3 Claims. (Cl. 119—53)

This invention relates to a fowl or poultry feeding device, and more specifically, the invention pertains to a poultry feeder which may be transported in knocked-down condition.

One of the primary objects of this invention is to provide a fowl or poultry feeder including a feed box having a sleeve formed therewith, the sleeve overlying the sides of the feed box to catch feed from the beaks of the birds as they are feeding.

Another object of this invention is to provide a fowl or poultry feeding device which includes a hopper and feed box, the relative positions of the hopper and feed box preventing the birds from standing sideways in the box and thereby preventing them from throwing the feed therefrom with their beaks.

A further object of this invention is to provide a feeding device for fowl or poultry including a feed box and a hopper therefor, together with means for adjusting the hopper relative to the feed box whereby the flow of various types of feed from the hopper to the feed box may be adjusted.

A still further object of this invention is to provide a poultry feeder of the type described above which may be placed on a litter, the floor, or may be suspended from the ceiling of a suitable shelter.

A still further object of this invention is to provide a fowl or poultry feeding device which may be economically manufactured, easily assembled, and durable in use.

Other and further objects of this invention will become more manifest from a consideration of the following specification when read in conjunction with the annexed drawings, in which:

Figure 1 is a side elevational view of a fowl or poultry feeding device constructed in accordance with the present invention.

Figure 2 is an enlarged cross-sectional view taken on the vertical plane of line 2—2 of Figure 1, looking in the direction of the arrows.

Figure 3 is an enlarged cross-sectional view taken on the horizontal plane of line 3—3 of Figure 1, looking in the direction of the arrows.

Figure 4 is a detail partial cross-sectional view taken on the vertical plane of line 4—4 of Figure 2, looking in the direction of the arrows.

Figure 5 is an enlarged fragmentary detail cross-sectional view taken on the vertical plane of line 5—5 of Figure 3, looking in the direction of the arrows.

Figure 6 is an enlarged fragmentary detail cross-sectional view taken on the horizontal plane of line 6—6 of Figure 1, looking in the direction of the arrows.

Figure 7 is an enlarged fragmentary detail cross-sectional view taken on the horizontal plane of line 7—7 of Figure 1, looking in the direction of the arrows.

Figure 8 is an enlarged fragmentary perspective view of one of the collar elements.

Referring now more specifically to the drawing, reference numeral 10 designates, in general, a fowl or poultry feeder constructed in accordance with the teachings of the present invention. As is illustrated in the drawing, the feeder 10 is seen to comprise a substantially hollow rectangular feed box 12 having a substantially rectangular base or bottom wall 14 from the sides of which arise a first pair of oppositely disposed horizontally elongated substantially rectangular side walls 16, 18, and a second pair of oppositely disposed horizontally elongated rectangular side walls 20, 22. The upper ends of the opposed side walls 16, 18 are bent inwardly to form a pair of spaced confronting elongated and substantially rectangular flanges 16A, 18A, and the upper ends of the opposed side walls 20, 22 are also bent inwardly to form a pair of spaced confronting elongated and substantially rectangular flanges 20A, 22A having their respective opposed ends overlapping adjacent end portions of the flanges 16A, 18A. Right angled reinforcing members 24 are electrically welded at 26 or otherwise secured to the adjacent portions of the side walls 16, 18, 20 and 22 at each corner of the feed box 12.

A substantially rectangular collar 28 is provided for the feed box 12 and is seen to comprise four identically constructed, separable angle members 30.

Each angle member includes a horizontally elongated substantially rectangular main body portion 32 having an integrally formed longitudinally extending substantially rectangular flange 34 projecting laterally away from a side thereof in one direction, and a second integrally formed longitudinally substantially rectangular flange 36 projecting laterally away from its other side in the reverse direction. As is seen in the drawing, the flange 36 is spaced equally inwardly from each end thereof, and the upper end of the flange 34 is reverted at 34A to lend reinforcement thereto. To provide assembly means, each end of the main body portion is provided with a transversely extending bolt or metal screw aperture 32A.

The collar 28 is assembled in two opposing pairs of the members 30 with the ends of one opposing pair overlapping the adjacent ends of the second pair of members, as is indicated at 38, and the apertures at each overlap are brought into alignment to receive fastening bolts or metal screws 41, and in the case of bolts, securing nuts 43.

It is to be understood that the angle members 30 are constructed as separable elements whereby the same may be compactly inserted into the feed box 12 for knock-down transportation. However, if desired, the collar may be constructed as a rigid unit.

As is seen in the drawing, the main body portion 32 of the collar 28 is superposed on the flanges 16A, 18A, 20A and 22A with the flanges 36 engaging against the confronting ends thereof and depending for a distance into the feed box 12. The flanges 34 project upwardly from the main body portion 32 forming a substantially continuous rectangular peripheral wall 39.

A feed hopper 40 for the feed box 12 is substantially rectangular in configuration and has open upper and lower ends. As shown in the drawing, the hopper is constructed from two identically formed V-shaped sheets of material 42 and each sheet comprises a pair of integrally formed side walls 44, 46 disposed at an angle of 90° with respect to each other. The lower and upper ends of the side walls 44, 46 are inverted to form horizontally elongated substantially rectangular reinforcing flanges 44A, 44B and 46A, 46B, respectively. The free ends of the side wall 46 are outwardly bent and reverted to form a vertically extending substantially rectangular flange 46C, and the free edge of the side wall 44 is bent laterally at substantially 90° forming an elongated substantially rectangular vertical flange 44C which is reverted to form a second elongated substantially rectangular and vertically extending flange 44D.

The two V-shaped sheets 42 are assembled by telescoping their respective flanges 46C into the channels formed between their respective flanges 44C and 44D to form an interlocking structure. The interlocked flanges are then, preferably, locked together by using a prick punch to make indentations in one or more places at both top and bottom of each joint.

Each of the side walls 44, 46 at the lower ends thereof are provided with a centrally positioned transversely extending aperture 50 which receive therethrough a ring 52 of an eye bolt 54 having an internally threaded shank 56. As is seen in the drawings, the lower ends of the walls 44, 46 are supported on the upper portions of the rings 52, and the shanks 56 of the bolts 54 extend through openings 58 formed in the bottom wall 14 and are adjustably secured thereto by lock nuts 60 threaded on the shanks 56 and which engage against opposite sides of the bottom wall 14.

The side walls 16, 18, 20 and 22 parallel the side walls 44, 46 and the walls 44, 46 are so spaced from the inner ends of the main body portion 32 of the sleeve 28 as to prevent fowl or poultry from standing and feeding sideways relative thereto.

The bottom wall 14 is provided with a centrally disposed transversely extending aperture 62 and receives therethrough the threaded lower end of an elongated rod 64 on which is threaded a pair of nuts 67, 69 to lock the rod to opposite sides of the bottom wall 14. The rod 64 extends above the upper end of the feed hopper 40 and the upper end thereof is bent to form a vertically elongated closed loop 66 forming a handle.

An inverted substantially V-shaped bracket rod 68 extends through the loop 66 with its apex engaging the lower end thereof. The arms 70, 72 of the rod 68 diverge downwardly from the loop 66 and are provided with intermediate portions 70A, 72A which project vertically downwardly and terminate in inwardly extending substantially horizontal confronting end sections 70B, 72B which project inwardly through apertures 74, 76, respectively, formed in the side walls 46 adjacent the upper ends thereof, the portions 70A, 72A and 70B, 72B taken together comprising a pair of hooks.

A closure member 78 comprising an inverted substantially V-shaped member is provided for the upper end of the hopper 40 and comprises a pair of downwardly extending elongated substantially rectangular top walls 80, 82 having a centrally positioned aperture 84 at the apex thereof to receive the looped handle 66 therethrough. The outer ends of the top walls 80, 82 are bent downwardly to form horizontally elongated substantially rectangular flanges 86, 88 which slidingly engage against the adjacent portions of the reverted ends 46B. As is seen in the drawings, the upper ends of the side walls 46 engage in the corner formed at the junction of the top walls 80, 82 with the rectangular flanges 86, 88.

From the foregoing description of the poultry or fowl feeding device, it becomes evident that the provision of the continuous peripheral wall 34 and the relative positions of the flanges 36 with respect to the side walls 44, 46 serve to catch the feed from the beaks of the birds as they are feeding, and also prevents the birds from standing along the feeder in a sideways fashion and prevents them from throwing out the feed with their beaks.

Additionally, the provision of the eye bolts 54 enables the operator to adjust the position of the lower end of the hopper 40 relative to the feed box 12 when using various types of feed, for example, grain, mash and pellets. These feeds all require a difference in adjustment of the position of the lower end of the hopper relative to the bottom wall 14.

The feeder 10 may be supported on the floor or may be suspended from the ceiling of any suitable structure by means of a hook 90, as is seen in Figure 1 of the drawings.

Having described and illustrated one embodiment of this invention, it is to be understood that the same is offered merely by way of example, and that the invention is to be limited only by the scope of the appended claims.

What is claimed is:

1. A fowl or poultry feeding device comprising a feed box having a bottom wall and a plurality of integrally formed oppositely disposed pairs of side walls, each of said oppositely disposed pairs of side walls having the free ends thereof extending inwardly of said feed box parallel with said bottom wall, a substantially rectangular collar comprising a plurality of angle members each of which includes a substantially horizontally elongated rectangular main body portion having an integrally formed longitudinally extending flange projecting laterally away from a side thereof in one direction and a second integrally formed longitudinally extending substantially rectangular flange projecting laterally away from its other side in the reverse direction, each of said angle members having its respective ends connected with the ends of adjacent angle members to form said rectangular collar, said main body portions of said angle members being superimposed upon opposed pairs of flanges with the first mentioned flanges thereof forming a continuous substantially rectangular peripheral wall, said second flanges of said angle members depending into said feed box and slidingly engaging against said opposed pairs of flanges, a hopper having a pair of opposed open ends, means connecting one of said open ends with said bottom wall of said feed box, a closure member for the other of said open ends of said hopper, and an elongated handle element having a pair of opposed ends, one of said ends of said handle element being fixedly secured to said bottom wall of said feed box, and the other end thereof projecting through said hopper and said closure member.

2. A poultry feeding device comprising a rectangular bottom wall, a plurality of side walls extending perpendicularly from said bottom wall forming a feed box, an inwardly extending upper end portion parallel to said bottom wall integrally formed on each of said side walls, a collar carried by said side walls comprising a vertical inner wall positioned adjacent the inner edges of said upper end portions and projecting toward said bottom wall, a horizontal panel integrally joined to and extending perpendicularly from said vertical inner wall, a vertical outer wall extending integrally upwardly from the outer edge of said panel, said horizontal panel extending beyond said side walls, and means including a hopper for supplying feed to said feed box.

3. A device as claimed in claim 2 wherein means are provided for securing said collar to said feed box.

References Cited in the file of this patent
UNITED STATES PATENTS

| | | |
|---|---|---|
| 1,149,477 | Thompson | Aug. 10, 1915 |
| 1,829,682 | Speicher | Oct. 27, 1931 |
| 2,660,150 | Kalb | Nov. 24, 1953 |

FOREIGN PATENTS

| | | |
|---|---|---|
| 126,047 | Australia | Nov. 10, 1947 |